Figure 1:
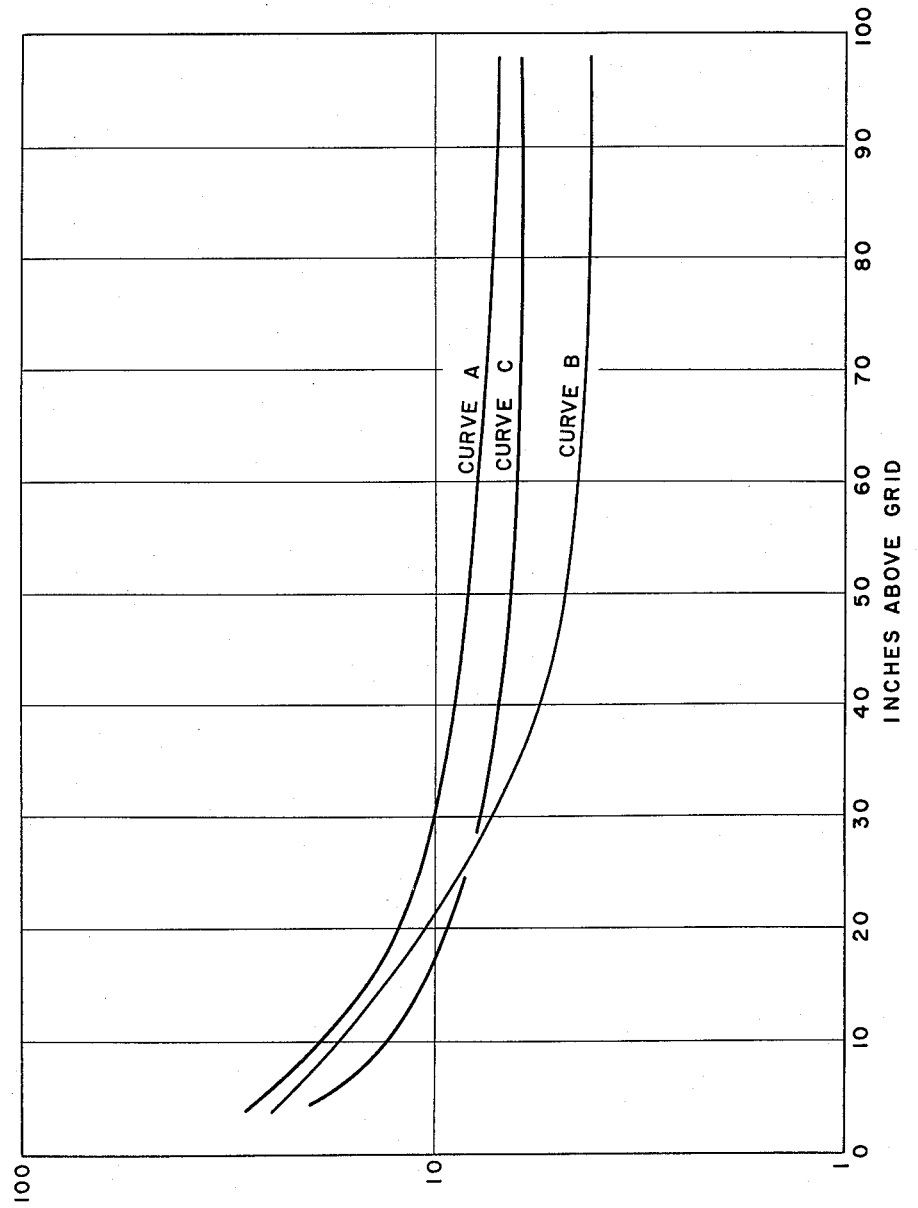

March 14, 1961  W. C. LAKE  2,975,037
GRID DESIGN FOR FLUIDIZED BEDS
Filed May 18, 1955  3 Sheets-Sheet 2

INVENTOR.
WILLIAM C. LAKE
BY
ATTORNEY

United States Patent Office 2,975,037
Patented Mar. 14, 1961

2,975,037
GRID DESIGN FOR FLUIDIZED BEDS

William C. Lake, Tulsa, Okla., assignor to Pan American Petroleum Corporation, a corporation of Delaware Filed May 18, 1955, Ser. No. 509,172

5 Claims. (Cl. 23—288)

The present invention relates to a novel method and apparatus for effecting reactions involving fluidized systems. More particularly, it is concerned with a novel apparatus and method whereby improved gas-solids contact in such systems can be effected. While the apparatus and method of my invention have a wide variety of applications insofar as fluidized systems are concerned, I have found them to be particularly applicable to the synthesis of hydrocarbons from carbon monoxide and hydrogen in the presence of a fluidized catalyst.

It has been observed that, although it is relatively easy to achieve good conversion of carbon monoxide to useful products when reacted with hydrogen under synthesis conditions in a reactor of small diameter, e.g., 2 inches, the conversion drops off very rapidly as the diameter of the reactor is increased. Thus, for example, in a pilot plant reactor 2 inches in diameter and approximately 20 feet in length, total feed carbon monoxide conversions of from 85 to 90 percent are secured, while with a reactor designed for commercial operations, i.e., 16 feet in diameter by 20 feet in length, under similar conditions of operation, the total feed carbon monoxide conversion is found to decrease to about 45 to 55 percent.

From my observations, I believe that the principal factor in this sharp difference in operating efficiency, as the diameter of the reactor increases, is the failure to achieve adequate gas-solids contacting under such conditions. This undesirable condition in reactors of larger diameter I believe to be due to the formation of large gas bubbles in the bed of fluidized catalyst, thereby creating a relatively small catalyst surface to gas volume ratio which means that the gaseous reactants are able to contact only a comparatively small portion of the total catalyst present in the reactor. Also, channeling of the gas through the catalyst bed tends to occur which diminishes further the possibility of favorable gas-solids contact during synthesis.

Accordingly, it is an object of my invention to provide a method and apparatus adapted for commercial operation capable of promoting good gas-solids contact, primarily by the maintenance of a fluidized catalyst bed having a substantially uniform density throughout the bed.

In the past, a wide variety of reactor designs have been used for handling fluidized systems. Most of such reactors may be modified in obvious ways to conform with the principles of my invention. For example, reactors of the type suitable for use in carrying out my invention when modified thereby are described in copending application U.S. Serial Number 412,794, filed October 18, 1954 by H. C. Eckstrom, now Patent No. 2,703,523, and in copending application U.S. Serial Number 512,147, filed May 31, 1955 by S. W. Walker, now Patent No. 2,931,711.

According to my invention, I am able to decrease the average bubble size of the reactant gases thereby promoting better gas-solids contact and, in turn, improving conversion. This object is accomplished by introducing the feed gas under conditions such that the rate of gas flow through the reactor grid increases from the center of the grid to the reactor wall. This increase in gas flow may be constant or it will be such that the gas flow rate is increased only beyond a certain region from the central area of the grid. However, in the latter case, the area of the increased gas flow should be at least the $\frac{1}{10}$ area of the grid nearest the reactor wall. In this regard, the portion nearest the reactor wall which receives such increased rate of gas flow may, for example, range from about the outer 10 percent to about the outer 60 percent of the grid area. Generally, the grid area receiving the increased gas flow rate is preferably from about the outer 25 percent to about the outer 50 percent. With grid areas less than the outer 10 percent, the increase in gas flow rate is ordinarily not enough to produce a beneficial effect. Although the method by which such increased gas flow is accomplished may vary rather widely, sufficient gas should pass through the central portion of the grid to maintain the catalyst or finely divided solids in a substantially uniform state of fluidization.

Distribution of gas flow across the reaction zone from the grid to the top of the fluidized catalyst bed may, for example, be controlled or altered by the specific pattern of holes employed in the reactor grid. Thus, I have observed that by going from a uniform to a nonuniform grid hole pattern, the gas flow in the reaction zone is materially altered and that the average number of gas bubbles rising through a fluidized bed at a given height in the bed and at a given linear velocity is changed, indicating a change in gas bubble size.

While the shape of the grid normally employed will be circular, it will be apparent that grids of other designs or shapes may be used in conformance with my invention. Thus, with any grid of uniform shape, the grid holes should be so distributed that the gas flow rate under conditions of constant pressure increases from the center of the grid to the periphery thereof. This, of course, contemplates the use of a grid in which the density of holes increases uniformly or nonuniformly. In the latter case, the greater hole density will be found in the outer area of the grid.

Although I generally prefer to introduce the feed gas into a reactor in accordance with the various procedures described above, the primary object of my invention may be accomplished by other means. For example, it would be possible to employ a grid having a uniform grid hole distribution by using two separate header systems for introducing the feed. With such a structure, the particular system injecting the feed through the outer portion of the grid would be operated at a higher pressure than that employed for injection of gas throughout the remainder of the grid holes.

In obtaining the information which will be described below in greater detail, variations in bubble size (bed density) at a given height in the fluidized catalyst bed were measured by observing the change in inductance of a coil placed therein. The change in inductance was amplified by using a bridge circuit in combination with an A.C. and a D.C. amplifier. The signal thus obtained was then recorded on a strip chart using a Brush recorder. The probe coil itself was located inside a short length of ¼ inch outside diameter seamless steel tubing which, in turn, was attached to a longer ½ inch outside diameter pipe. Different locations in the bed were examined by inserting the probe through the top of the reactor and lowering the probe to a predetermined level. To prevent the probe from getting out of position, it is necessary to have movable "spiders" attached to the probe rod. The locations within the bed which can be examined are limited by the requirement that the field of the probe, which is about 1 inch in diameter, should not encounter permanently located iron objects, such as the tube walls.

In order to demonstrate further the advantages of my improved method and grid design for effecting better gas-solids contacting, attention is called to Figure 1, wherein the increase in average bubble count at a cross-section of the reactor versus bed height is plotted for the following changes in grid hole distribution.

| Curve | Percent Gas Flow in 25% Area Nearest Reactor Walls |
|---|---|
| A | 36 |
| B | 13 |
| C | 23 |

Figure 2:
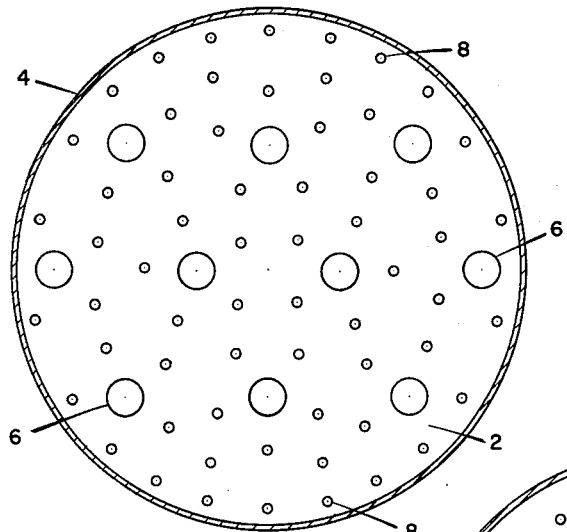

The information on which the curves in Figure 1 are based was obtained by using a reactor 2½ feet in diameter and approximately 15 feet high. The height of the catalyst (iron mill scale) bed was about 10 feet (static). The linear velocity employed was 0.8 foot per second, the grid hole diameter was ⅛ inch and the outer diameter of the vertical tubes in the reactor was 2 inches. Air was used as the fluidizing gas. The grid design employed in obtaining the information shown in curve A is illustrated in Figure 2, which is a plan view of the grid 2 set in a cylindrical reactor shell 4. A total of 10 tubes 6 and 62 grid holes 8 was employed. The distribution of these grid holes was such that the area corresponding to the outer 25 percent of the grid contained 36 percent of the holes.

Figure 3:
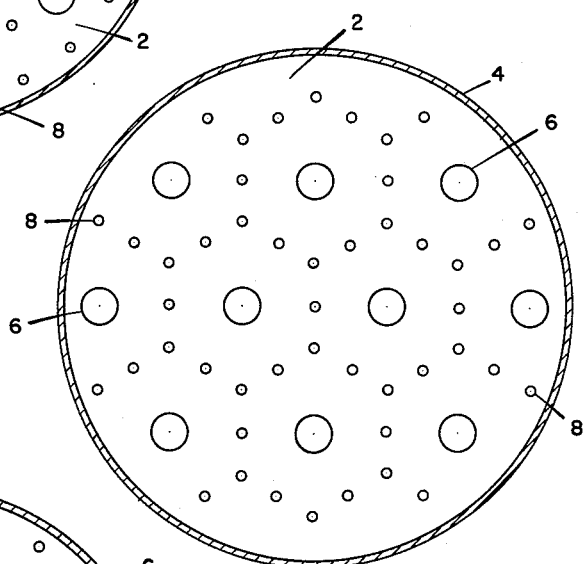

Curve B is based on a run using a grid design such as that shown in Figure 3. In this design the grid holes in the outer 25 percent area were reduced in number so that they amounted only to 13 percent of the total number of holes. Ten tubes and 47 grid holes were used in this design.

Figure 4:
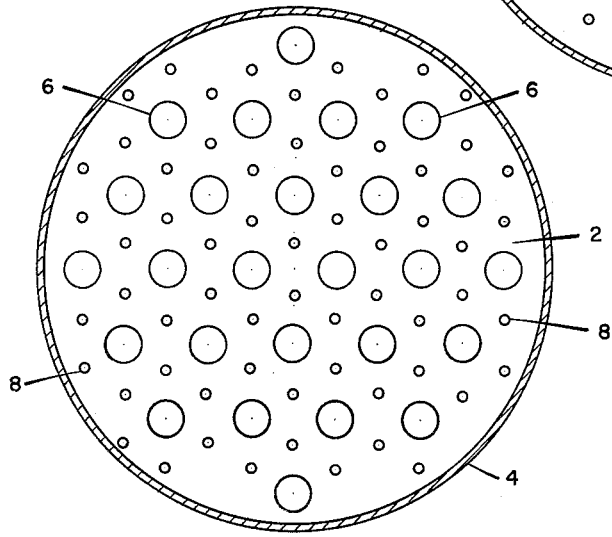

Curve C was obtained from a run in which a grid such as that illustrated in Figure 4 was employed. In this design the grid hole distribution was substantially uniform, i.e., 23 percent of the total number of holes was in the outer 25 percent area of the grid. The number of grid holes was the same as in Figure 2, with 26 tubes used.

It can be seen from Figure 1 that in the upper half of the bed curve A has an average bubble count which is about 60-70 percent greater than that for curve B. Curve C shows the tendency of the bubble count to increase with an increase of grid holes in the outer portion of the grid. Thus, while the results illustrated in curve C indicate better conditions than those obtained in curve B, they are still inferior to the results shown the curve A.

Figure 5:
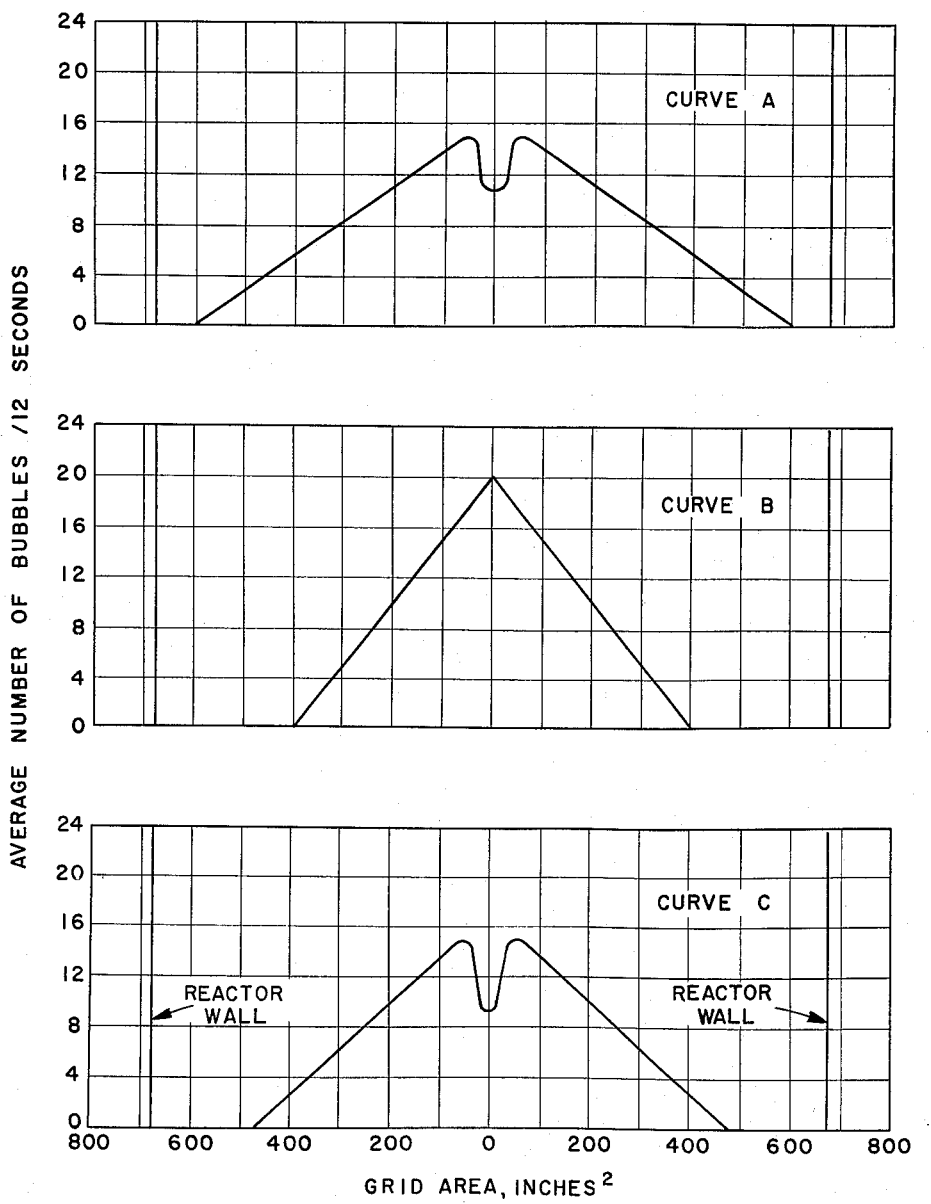

A further interesting analysis of the above curves demonstrating the advantages of my invention is shown in Figure 5. In obtaining these curves, the average number of bubbles per unit of time (12 seconds), obtained at a height 6 feet above the grid, was plotted against the grid area with the center line drawn through each of the curves A, B and C of Figure 5, representing the center of the reactor grid. It is known that under normal conditions of operation, including the use of a grid having a uniform distribution of holes, the majority of the feed gas tends to channel up through the central part of the fluidized bed with streams of catalyst tending to flow downwardly along the walls of the reactor. As plotted in Figure 5, it will be seen that curve A is based on the same conditions as those on which curve A of Figure 1 is based, and covers the largest grid area. In other words, the presence of bubbles was detected over a larger portion of the cross-sectional area of the reaction zone than in the case of either of the other runs represented by curves B and C. It should be noted in this connection that the number of bubbles per unit of time decreases linearly with area. It will also be apparent that the conditions produced in the system during the run on which curve B is based were the worst of the three conditions investigated. In this run, it will be recalled that only 13 percent of the total number of grid holes was in the outer 25 percent grid area.

Although the above-mentioned methods and grid designs to be used in improving gas-solids contacting in accordance with my invention are contemplated for use in hydrocarbon synthesis, it will likewise be apparent that the apparatus and method of my invention may be adapted to any process involving the use of a fluidized solids bed wherein it is desired to improve the gas-solids contacting efficiency. For example, a varied gas flow rate may be obtained by employing a grid in which the holes in the outer area thereof are larger than those in the remaining area of said grid. Other means for obtaining a varying gas flow rate as taught herein will occur to those skilled in the art. It is to be understood therefore that any of such modifications are to be considered as lying within the scope of my invention.

I claim:

1. A flat perforated grid for use in a reactor adapted for conducting reactions involving fluidized systems, the holes in said grid having a distribution such that the hole density within the outer 10 percent of said grid per unit area is greater than the hole area per unit area in the remaining 90 percent of said grid, said holes being substantially uniform in size.

2. A flat perforated grid for use in a reactor adapted for conducting reactions involving fluidized systems, the holes in said grid having a distribution such that the hole density within the outer 60 percent of said grid per unit area is greater than the hole area per unit area in the remaining 40 percent of said grid, said holes being substantially uniform in size.

3. A flat perforated grid for use in a reactor adapted for conducting reactions involving fluidized systems, the holes in said grid being of uniform size and having a distribution such that the density of holes per unit area of said grid increases from the center of said grid to the periphery thereof.

4. In a reactor adapted for conducting reactions involving fluidized systems the combination comprising a substantially vertical shell having a perforated grid located in the lower portion thereof, the density of the holes in said grid per unit area of said grid being greater in from about the outer 10 percent to about the outer 60 percent of said grid, said holes being substantially uniform in size.

5. In a reactor adapted for conducting reactions involving fluidized systems the combination comprising a substantially vertical shell having a perforated grid located in the lower portion thereof, the density of the holes in said grid per unit area of said grid being greater in from about the outer 25 percent to about the outer 50 percent of said grid, said holes being substantially uniform in size.

References Cited in the file of this patent

UNITED STATES PATENTS

| | | |
|---|---|---|
| 1,223,460 | Widner | Apr. 28, 1917 |
| 2,357,901 | Lewis | Sept. 12, 1944 |
| 2,393,893 | Evans | Jan. 29, 1946 |
| 2,409,780 | Mekler | Oct. 22, 1946 |
| 2,412,136 | Evans | Dec. 3, 1946 |
| 2,468,508 | Munday | Apr. 26, 1949 |
| 2,503,788 | White | Apr. 11, 1950 |
| 2,554,413 | Kuhn | May 22, 1951 |
| 2,562,903 | Fontana | Aug. 7, 1951 |